United States Patent [19]

Takemoto et al.

[11] 4,138,974
[45] Feb. 13, 1979

[54] AIR-FUEL MIXTURE INTAKE SYSTEM

[75] Inventors: Yasunori Takemoto; Tsutomu Matsuoka, both of Hiroshima; Tadataka Nakasumi, Kure, all of Japan

[73] Assignee: Toyo Kogyo Co., Ltd., Hiroshima, Japan

[21] Appl. No.: 841,432

[22] Filed: Oct. 12, 1977

[30] Foreign Application Priority Data

Oct. 13, 1976 [JP] Japan .................... 51-138195[U]

[51] Int. Cl.² .................. F02M 23/04; F02T 9/00; F02M 23/00
[52] U.S. Cl. .................. 123/97 B; 123/32 ST; 123/124 R; 123/127; 261/DIG. 19; 261/23 B; 261/41 D
[58] Field of Search .......... 123/97 B, 32 ST, 127, 123/119 D, 119 DB, 124 R, 124 A, 124 B; 261/DIG. 19, 23 B, 41 D

[56] References Cited

U.S. PATENT DOCUMENTS

| 3,470,855 | 10/1969 | Von Seggern et al. | 123/97 B |
| 3,547,089 | 12/1970 | Pierlot | 123/97 B |
| 3,570,821 | 3/1971 | Walker | 123/97 B |
| 3,601,106 | 8/1971 | Nakajima | 123/97 B |
| 3,688,752 | 9/1972 | Baudry | 123/97 B |
| 3,698,371 | 10/1972 | Mitsuyama et al. | 123/97 B |
| 3,702,603 | 11/1972 | Baxendale et al. | 123/97 B |
| 3,982,507 | 9/1976 | Asaka et al. | 123/97 B |
| 3,982,513 | 9/1976 | Nakagawa | 123/97 B |
| 3,994,268 | 11/1976 | Okunishi et al. | 123/97 B |
| 4,008,696 | 2/1977 | Hisatomi et al. | 123/97 B |

Primary Examiner—Wendell E. Burns
Attorney, Agent, or Firm—Wenderoth, Lind & Ponack

[57] ABSTRACT

An improved air-fuel mixture intake system for use in a internal combustion engine having a light load side intake passage and a heavy load side intake passage which are joined each other in the vicinity of an intake valve of the engine. The intake system includes engine deceleration detecting means, a first on-off valve provided in a fuel supplying path of a light load side carburetor, an air supplying passage opened into the heavy load side intake passage at downstream of a heavy load side carburetor throttle valve, and a second on-off valve provided in the air supplying passage for reduction of noxious hydrocarbon formation and prevention of afterburning, with suppression of undesirable knocking.

9 Claims, 1 Drawing Figure

AIR-FUEL MIXTURE INTAKE SYSTEM

BACKGROUND OF THE INVENTION

The present invention relates to an internal combustion engine and more particularly, to an air-fuel mixture intake system having two independent intake passages for light and heavy load operations for use in an internal combustion engine.

Conventionally, in an internal combustion engine which is equipped with the so-called dual or duplex air-fuel mixture intake system having two intake passages with respect to a combustion chamber of the engine for light load or low speed operation and heavy load or high speed operation respectively, for example, one disclosed in Japanese Utility Model publication Jitsukosho 31921/76, the intake passage for the light load operation having a small cross sectional area is arranged to be joined, in the vicinity of an intake valve of the engine, into the intake passage for the heavy load operation having a large cross sectional area so that during an idle operation and ordinary low or medium speed operation of the engine, only the light load side intake passage of the small cross sectional area is used for accelerating flow rate of the air-fuel mixture so as to expedite atomization and vaporization thereof, while during the heavy load operation of the engine, the air-fuel mixture is supplied also through the heavy load side intake passage of the large cross sectional area for improvement of the engine output.

In the conventional air-fuel mixture intake systems, for minimizing undesirable noxious compounds such as unburned hydrocarbon compound in the exhaust gases and also to prevent after-burning, it has been a conventional practive to provide an on-off valve, in a fuel supplying passage of an engine carburetor, for suspension of fuel supply from the fuel supplying passage during engine deceleration by closing the on-off valve. The above known arrangement, however, has such disadvantages that starting of fuel supply tends to be delayed at re-acceleration after engine deceleration, and that undesirable knocking phenomenon is developed at an initial stage of the acceleration, with consequent deterioration in the running performance of a vehicle. For example, in U.S. Pat. No. 3,080,858, supply of fuel is cut off by closing a fuel supplying passage of slow fuel system during deceleration.

Similarly, there have conventionally been proposed another arrangements, for example, in U.S. Pat. No. 3,081,985 in which primary air is introduced during engine deceleration through negative pressure at downstream of a throttle valve in the intake passage. This known arrangement, however, still have some problems to be solved for optimum reduction of hydrocarbon compound formation at the engine deceleration, and for prevention of after-burning and knocking.

Accordingly, an essential object of the present invention is to provide an improved air-fuel mixture intake system for use in an internal combustion engine which fully utilizes advantages of a duplex air-fuel mixture intake system for reducing generation of noxious hydrocarbon compound at deceleration and also for prevention of undesirable after-hurning.

Another important object of the present invention is to provide an air-fuel mixture intake system of the above described type which is free from the knocking phenomenon at an initial stage of acceleration, with substantial elimination of disadvantages inherent in the conventional air-fuel mixture intake systems.

A further object of the present invention is to provide an air fuel mixture intake system of the above described type which is simple in structure and highly reliable, and can be readily incorporated into internal combustion engines of the kind at low cost.

In accomplishing these and other objects, according to one preferred embodiment of the present invention, the air-fuel mixture intake system is intended for use in an internal combustion engine having a light load side intake passage and a heavy load side intake passage which are joined each other in vicinity of intake valve for an intake port of the internal combustion engine, and includes means for detecting deceleration of engine speed, first on-off valve provided in a fuel supplying path of a light load side carburetor, with the first on-off valve being closed, during the engine deceleration, through first actuating means operated by signal from said deceleration detecting means for interrupting supply of fuel through the fuel supplying path, an air supplying passage opened at its one end into the heavy load side intake passage at downstream of a heavy load side carburetor throttle valve, and second on-off valve provided in said air supplying passage, with the second on-off valve means being actuated to be opened, during the engine speed deceleration, through a second actuating means operated by detection of the engine deceleration for supplying air into said heavy load side intake passage through said air supplying passage.

In other words, according to the air-fuel mixture intake system of the present invention, the fuel supply interrupting means is provided in the light load carburetor side to stop the fuel supply at the light load side during the engine deceleration, and the air supply means is provided to supply air in the high load side intake passage during engine deceleration, for reducing formation of the unburned noxious compound, e.g., hydrocarbon and preventing the undesirable after-burning, whereby at the acceleration after the engine deceleration, since the flow rate of the air-fuel mixture flowing through the light load side intake passage of the small cross sectional area is sufficiently fast with favorable atomization, and the air supply during deceleration is not in the light load side intake passage but in the high load side intake passage, delay in starting the fuel supply is prevented, with generation of the knocking being advantageously prevented.

BRIEF DESCRIPTION OF THE DRAWING

These and other objects and features of the present invention will become apparent from the following description taken in conjunction with the preferred embodiment thereof with reference to the accompanying drawing, in which.

DETAILED DESCRIPTION OF THE INVENTION

Figure 1:
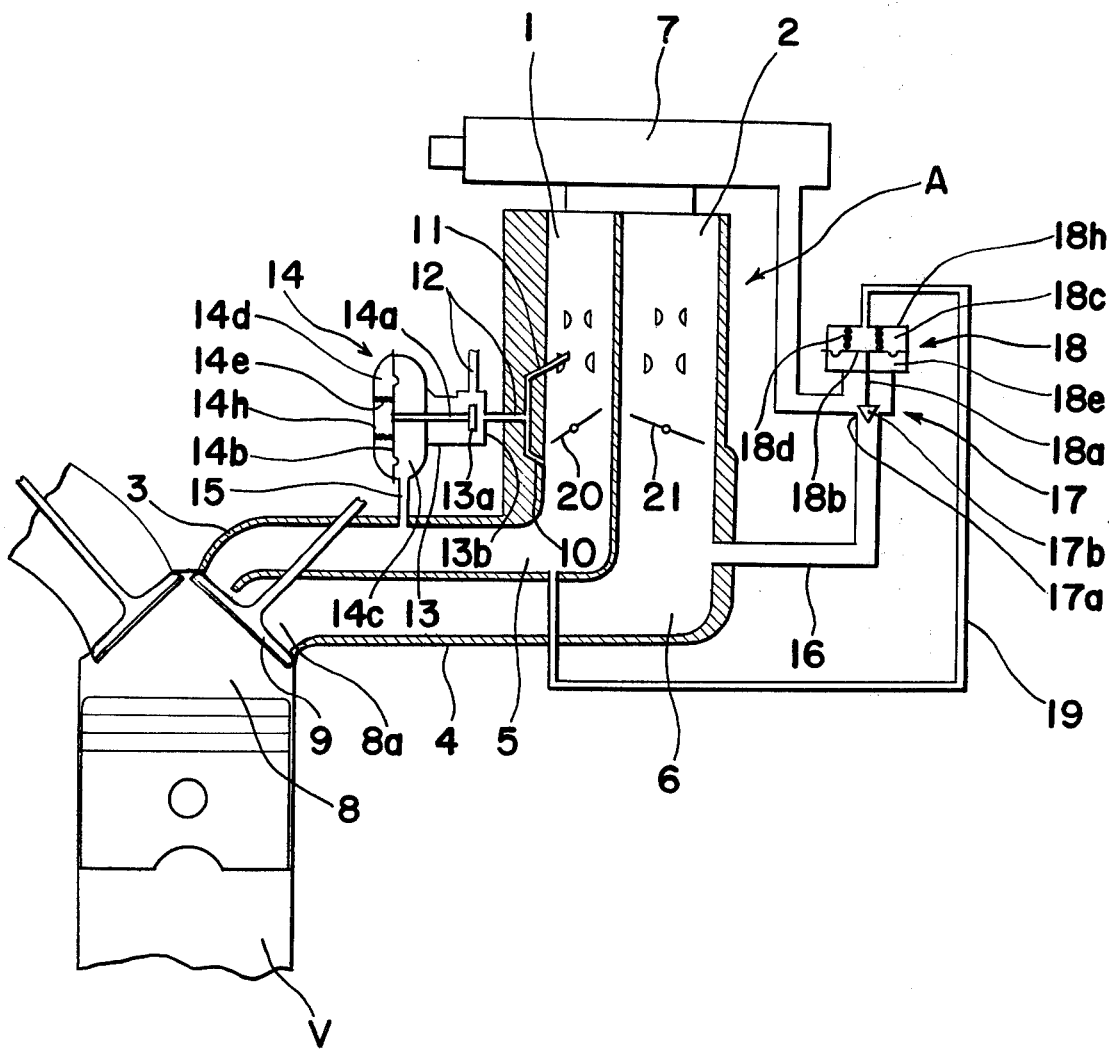
FIG. 1 is a schematic side sectional view of an air-fuel mixture intake system according to one preferred embodiment of the present invention.

Referring now to the drawing, there is shown in FIG. 1 an air-fuel mixture intake system A according to one preferred embodiment of the present invention which is coupled to a combustion chamber 8 of a cylinder V of an internal combustion engine. The intake system A includes a carburetor 1 for light load or low speed operation which is connected to a light load side intake manifold 3, and a carburetor 2 for heavy load or high speed operation which is coupled to a heavy load side intake manifold 4, while the light load side intake manifold 3 and heavy load side intake manifold 4 are further provided with a light load side intake passage 5 having a small cross sectional area and a heavy load side intake passage 6 having a large cross sectional area respectively. The light load and heavy load side carburetors 1 and 2 are communicated with a common air cleaner 7 for drawing in air therethrough, and the intake passages 5 and 6 for light and heavy load operations are connected to an intake port 8a for the engine combustion chamber 8 of the cylinder V so that, according to selective opening and closing of an intake valve 9, the air-fuel mixture is introduced through the light load side intake passage 5 into the combustion chamber 8 during idle operation or light and medium load operations, and through both of the light load and heavy load side intake passages 5 and 6 into the same combustion chamber 8 during heavy load operation. The light load side carburetor 1 is further provided in its wall with a slow system fuel supplying passage 10 and a main system fuel supplying passage 11 branched from one end of common fuel supplying path 12 so as to be opened into the carburetor 1 in positions adjacent to a light load carburetor throttle valve 20, while the common fuel supplying path 12 is connected at the other end thereof to a float chamber (not shown) of the carburetor through an on-off valve 13 for selective opening and closing of the path 12. It is to be noted here that the on-off valve 13 described above as provided in the path 12 may be modified to be installed only in the above slow system fuel supplying passage 10, or only in the above main system fuel supplying passage 11 or both in the slow and main system fuel supplying passages 10 and 11. The on-off valve 13 includes a valve body 13a secured to one end of a valve rod 14a which is in turn fixed at the other end thereof to a diaphragm 14b of a diaphragm device 14 housed in a housing 14h and secured at the outer periphery thereof to walls of the housing 14h for dividing said housing 14h into two pressure chambers 14c and 14d so that the valve body 13a selectively contacts and leaves a valve seat 13b following the movements of the valve rod 14a for closing and opening of the common fuel supplying path 12. Meanwhile, one chamber 14c of the two pressure chambers 14c and 14d formed in the housing 14h by the diaphragm 14b is communicated with a negative pressure deriving passage 15 opened at one end thereof into the light load side intake passage 5 at the downstream of the throttle valve 20 for the light load side carburetor 1, with the other chamber 14d of the two pressure chambers 14c and 14d being opened into atmosphere, while a spring 14e is confined in the chamber 14d between the housing 14h and the diaphragm 14b for urging the valve body 13a in a direction to open the fuel supplying path 12. Since a large intake negative pressure is introduced into the pressure chamber 14c of the diaphragm device 14 during engine deceleration due to the fact that the throttle valve 20 for the light load side carburetor 1 is fully closed, the diaphragm 14b is displaced against the urging force of the spring 14e in a direction to cause the valve body 13a to close the fuel supplying path 12 through the valve rod 14a, and thus the diaphragm device 14 serves simultaneously as a deceleration detecting means and also as a mechanism for actuating the valve body 13a through functioning of the deceleration detecting means. It is to be noted that the mechanism for actuating the on-off valve 13 is not limited to be the diaphragm device 14 as described above, but that the on-off valve 13 may be modified to be actuated by any other actuating means which functions by deceleration signal or the like from a suitable deceleration detecting means for detecting engine speed deceleration actuated through detection, for example, of engine revolutions and opening degree of the throttle valve.

The air-fuel mixture intake system A further includes an air supplying passage 16 communicated at one end thereof with the air cleaner 7, and opened at the other end thereof into the heavy load side intake passage 6 at the downstream of a throttle valve 21 for the heavy load side carburetor 2 mentioned earlier, with a passage on-off valve 17 being provided in the course of the air supplying passage 16. The on-off valve 17 is arranged to be actuated to open by a diaphragm device 18 during engine deceleration for introducing air into the heavy load side intake passage 6, which diaphragm device 18 includes a housing 18h, and a diaphragm 18b secured at the outer periphery thereof to walls of the housing 18h to divide the housing 18h into two pressure chambers 18c and 18e and connected at its central portion to one end of a valve rod 18a, while a valve body 17b is secured to the other end of the valve rod 18a for selective contact with and spacing away from a valve seat 17a for closing and opening the air supplying passage 16. A spring 18d is confined in one chamber 18c of the pressure chambers 18c and 18e, between the housing 18h and the diaphragm 18b for urging the valve body 17b in a direction to close the air supplying passage 16 through the diaphragm 18b and valve rod 18a. The pressure chamber 18c is connected to one end of a negative pressure deriving passage 19 whose other end is opened into the light load side intake manifold 3, and thus, during engine deceleration, since the throttle valves 20 and 21 are fully closed, a large negative pressure is introduced into the pressure chamber 18c so that the valve body 17b is actuated for opening the passage 16 against the urging force of the spring 18d through the diaphragm 18b and valve rod 18a and the air is supplied in the intake passage 6. The other chamber 18e of the pressure chambers 18c and 18e is opened to atmosphere.

It should be noted here that the means for actuating the on-off valve 17 is not limited to be the diaphragm device 18, but the valve 17 may be modified to be actuated by any other suitable means for detecting the engine deceleration to cause the valve body 17b to open the air supplying passage 16.

Although, in the present invention, fuel supplying in the light load side intake passage is cut-off, during engine deceleration, while air supplying in the high load side intake passage is applied, the arrangement for the former will be firstly mentioned hereinafter.

In the air-fuel mixture intake system A as described above, since the throttle valve 20 for the light load side carburetor 1 is closed during the engine deceleration, a large negative pressure is built up in the light load side intake passage 5, and is introduced into the pressure chamber 14c of the diaphragm device 14 through the negative pressure deriving passage 15 to displace the diaphragm 14b against the urging force of the spring 14e and consequently to cause the valve body 13a to close the fuel supplying path 12, with supplying of the fuel through the slow and main system fuel passages 10 and 11 being thus interrupted. Accordingly, during the engine deceleration, the fuel is not supplied through the light load side intake passage 5, and thus not only the unburned hydrocarbon compound is markedly reduced, but the undesirable after-burning liable to take place at the time of engine deceleration is advantageously prevented.

Furthermore, in the air-fuel mixture intake system A according to the present invention, when the engine is accelerated after deceleration, the intake negative pressure within the light load side intake passage 5 is rapidly reduced, and the valve body 13a is subjected to opening through the diaphragm device 14 to release the suspension of the fuel supply at the side of the light load carburetor 1. In the acceleration after the engine deceleration as described above, delay in starting the fuel supply is hardly noticed, since the flow rate of the air-fuel mixture flowing through the light load side intake passage 5 is fast, with superior atomization and vaporization of the fuel, and therefore, generation of the undesirable knocking phenomenon during the acceleration after engine deceleration can be effectively prevented.

One example of comparison between air fuel ratio at the time of acceleration after engine deceleration according to the intake system of the present invention and air fuel ratio for a single intake passage in the conventional intake systems is described hereinbelow.

On the assumption that the test condition is following,

Engine ..... 1,273 cc
Deceleration negative pressure .... −600 mmHg
Acceleration negative pressure .... −200 mmHg
During acceleration ..... Air fuel ratio 14 and that the amount of air between the carburetor and intake valve is following, Intake system according to the present invention (light load side) ..... 300 cc
Conventional intake systems ..... 800 cc the air fuel ratio within the combustion chamber immediately after the engine deceleration is calculated as follows on the supposition that there is no delay in the starting of fuel supply.

The intake system of the present invention ..... Air fuel ratio 15
Conventional intake systems ..... Air fuel ratio 17

As is clear from the foregoing description, according to the air fuel mixture intake system of the present invention, since the fuel supply at the light load side is interrupted at the time of engine deceleration, the undersirable after-burning at such engine deceleration is positively prevented, while formation of noxious compound, e.g., hydrocarbon, is minimized, and overheating of an exhaust gas purification system, if the exhaust gas purification system may be employed, is advantageously prevented, with further reduction of fuel consumption. Additionally, at the acceleration after the engine deceleration, the undesirable knocking phenomenon is reduced to a negligibly low level through utilization of the advantages of the light load side intake passage having the small cross sectional area.

Furthermore, according to the air fuel mixture intake system of the present invention, at the time of the engine deceleration, the on-off valve 17 which is provided in the air supplying passage 16 communicated at its one end to the air cleaner 17 and opened at its other end into the intake passage 6 at the downstream of the throttle valve 21 of the heavy load side carburetor 2 is opened for supplying air into the heavy load intake passage 6 through said air supplying passage 16, and thus reduction of the hydrocarbon compound and prevention of the after burning are effected still more effectively.

Moreover, if air is supplied into the light load intake passage 5 during the engine deceleration, there may be such a problem that the fuel in the liquid state remaining within the light load intake passage 5 is introduced into the combustion chamber 8 by a comparatively high negative pressure during deceleration and thus it is intend to give rise to the knocking phenomenon due to delay in starting of fuel supply after the engine deceleration, but in the arrangement of the present invention, by supplying air into the heavy load intake passage 6, such inconveniences as described above are advantageously eliminated, and since the fuel is smoothly supplied during the re-acceleration after the engine deceleration, the generation of the knocking is also prevented.

Although the present invention has been fully described by way of example with reference to the attached drawing, it is to be noted that various changes and modifications are apparent to those skilled in the art. Therefore, unless otherwise such changes and modifications depart from the scope of the present invention, they should be construed as included therein.

What is claimed is:

1. An air-fuel mixture intake system for use in an internal combustion engine having a light load side intake passage and a heavy load side intake passage which are connected to a intake port of the internal combustion engine, and an intake valve provided on the intake port, said airfuel mixture intake system comprising means for detecting decelerated of engine speed, first valve means provided in a fuel supplying path of a light load side carburetor, said first valve means being actuated, during the engine deceleration, by signal from said deceleration detecting means for interrupting supply of fuel through said fuel supplying path, an air supplying passage opened at its one end into said heavy load side intake passage at down-stream of a heavy load side carburetor throttle valve, and second valve means provided in said air supplying passage, said second valve means being actuated to be opened, during the engine deceleration, by detection of the engine deceleration for supplying air into said heavy load side intake passage through said air supplying passage.

2. An air-fuel mixture intake system as claimed in claim 1, wherein said fuel supplying path of said light load side carburetor includes a slow system fuel passage and a main system fuel passage, with said first valve means being provided in said slow system fuel passage.

3. An air-fuel mixture intake system as claimed in claim 1, wherein said fuel supplying path of said light load side carburetor includes a slow system fuel passage and a main system fuel passage, with said first valve means being provided in said main system fuel passage.

4. An air-fuel mixture intake system as claimed in claim 1, wherein said fuel supplying path of said light load side carburetor includes a slow system fuel passage and a main system fuel passage, with said first valve means being provided both in said slow system fuel passage and main system fuel passage.

5. An air-fuel mixture intake system as claimed in claim 1, further comprising a first actuating means for actuating said first valve means, which is a first diaphragm device which simultaneously acts as said deceleration detecting means and said actuating means.

6. An air-fuel mixture intake system as claimed in claim 1, further comprising a first actuating means for actuating said first valve means, which is a first actuating device operated by signal from said deceleration detecting means.

7. An air-fuel mixture intake system as claimed in claim 1, wherein said air supplying passage is opened at its other end into atmosphere through said second valve means.

8. An air-fuel mixture intake system as claimed in claim 1, further comprising a second actuating means for actuating said second valve means, which is a second diaphragm device connected to one end of a negative pressure deriving passage whose other end is opened into a light load side intake manifold which is coupled to said light load side intake passage for causing the second valve means to open during engine deceleration through negative pressure introduced into said second diaphragm device.

9. An air-fuel mixture intake system as claimed in claim 1, further comprising a second actuating means for actuating said second on-off valve means, which is a second actuating device which is actuated to open said second valve means through detection of the engine deceleration.